(12) United States Patent
Kamrath et al.

(10) Patent No.: US 12,467,368 B1
(45) Date of Patent: Nov. 11, 2025

(54) TURBINE BLADE DOUBLE TIP FLAG COOLING SYSTEM

(71) Applicant: HONEYWELL INTERNATIONAL INC., Charlotte, NC (US)

(72) Inventors: Benjamin Kamrath, Mesa, AZ (US);
Daniel Crites, Phoenix, AZ (US);
Ardeshir Riahi, Phoenix, AZ (US);
Spencer Sperling, Phoenix, AZ (US);
Mark Morris, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 19/011,873

(22) Filed: Jan. 7, 2025

(51) Int. Cl.
*F01D 5/20* (2006.01)
*F01D 5/14* (2006.01)
*F01D 5/18* (2006.01)

(52) U.S. Cl.
CPC .............. *F01D 5/20* (2013.01); *F01D 5/141* (2013.01); *F01D 5/18* (2013.01); *F05D 2260/221* (2013.01)

(58) Field of Classification Search
CPC .......................... F05D 2260/221; F01D 11/10
See application file for complete search history.

(56) References Cited

U.S. PATENT DOCUMENTS

| | | | |
|---|---|---|---|
| 7,607,891 | B2 | 10/2009 | Cherolis et al. |
| 7,625,178 | B2 * | 12/2009 | Morris ................... F01D 5/187 29/889.7 |
| 7,665,968 | B2 * | 2/2010 | Mongillo, Jr. .......... F01D 5/187 416/97 R |
| 8,016,561 | B2 | 9/2011 | Moniz et al. |
| 8,192,146 | B2 | 6/2012 | Liang |
| 8,491,264 | B1 * | 7/2013 | Liang ..................... F01D 5/187 416/97 R |
| 9,546,554 | B2 | 1/2017 | Crites et al. |
| 10,174,622 | B2 | 1/2019 | Zhang et al. |
| 10,502,067 | B2 | 12/2019 | Mongillo et al. |
| 10,563,518 | B2 | 2/2020 | Konitzer et al. |
| 10,830,059 | B2 | 11/2020 | Meier et al. |
| 11,035,235 | B2 | 6/2021 | Dujol et al. |
| 11,236,618 | B2 | 2/2022 | Pang et al. |
| 11,333,042 | B2 | 5/2022 | Crites et al. |
| 11,434,768 | B2 | 9/2022 | Peters et al. |

(Continued)

OTHER PUBLICATIONS

J.R. Christophel, K.A. Thole & F.J. Cunha, Cooling the Tip of a Turbine Blade Using Pressure Side Holes—Part II: Heat Transfer Measurements, Jul. 24, 2007.

*Primary Examiner* — Danielle M. Christensen
(74) *Attorney, Agent, or Firm* — Ingrassia Fisher & Lorenz, LLP

(57) ABSTRACT

Systems provide enhanced cooling of tip regions of turbine blades. A cooling system includes a turbine blade with a root, a base, a tip, a leading edge, a trailing edge, an outer structure that includes a pressure side wall, a suction side wall and a tip cap at its tip. A core in the blade defines a leading channel that ejects cooling air through the leading edge. A primary tip flag channel ejects cooling air through the tip and the trailing edge. A secondary tip flag channel ejects cooling air through the trailing edge. The primary tip flag channel and the secondary tip flag channel promote cooling of the tip due to the locations in the tip area and their delivery of low temperature and high pressure cooling air thereto.

20 Claims, 5 Drawing Sheets

(56) References Cited

U.S. PATENT DOCUMENTS

| | | |
|---|---|---|
| 11,913,353 B2 | 2/2024 | Place et al. |
| 12,203,388 B1 * | 1/2025 | Spangler ................... F01D 5/20 |
| 2016/0169002 A1 | 6/2016 | Chlus et al. |
| 2018/0051566 A1 | 2/2018 | Bunker |
| 2018/0298763 A1 * | 10/2018 | Lee ........................... F01D 5/20 |

* cited by examiner

TURBINE BLADE DOUBLE TIP FLAG COOLING SYSTEM

TECHNICAL FIELD

The present disclosure generally relates to blade cooling in rotating machinery and, more specifically, to rotating blades of a gas turbine engine with a double tip flag cooling system for increased tip region cooling control BACKGROUND Rotating machinery such as turbine engines may be employed to power various devices. For example, a gas turbine engine may be employed to power a mobile platform, such as aircraft, land vehicles, sea vehicles or stationary platforms and other machines. Generally, within rotating machinery, various components are connected together to form rotating assemblies. For example, in a turbine a number of blades are connected in a rotor.

In rotating machinery, stress may arise at a number of locations and due to a number of factors. For example, heat loading, in particular around the tips of turbine blades, may result in thermal stress. The areas at and around turbine blade tips experience thermal loading that increases as higher performance levels are demanded. Hot sections of gas turbine engines, for example, may include cooled turbine blades to prevent stress from high turbine inlet temperatures. Compressor bleed air may be used for cooling and may be delivered through cooling passages in blade roots and into the blades to remove heat transferred to the blade from the hot gas stream. Determining a cooling strategy and providing the optimum quality and quantity of cooling air to the desired parts of the blades is challenging. Insufficient cooling at any particular place on a blade may lead to deterioration of the structure and the material from which it is made. Once deterioration is initiated, additional thermal cycles progressively add to the initiated changes and may eventually result in a need for repair.

Accordingly, it is desirable to provide systems for rotating machinery that provide more effective cooling of turbine blades. In addition, it is preferable if such systems do not increase manufacturing complexity or mass. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

Systems provide enhanced cooling of the tip area of turbine blades. In a number of embodiments, a cooling system for a turbine, the cooling system includes a number of blades extending from a root. Each blade is defined between a base proximate the root and a tip distant from the root, and also from a leading edge to a trailing edge. The blade(s) includes an outer structure that has a pressure side wall and a suction side wall that join together at the leading edge and the trailing edge. The blade(s) includes a tip cap at the tip that joins with the pressure side wall and the suction side wall. A core is defined in the blade(s) within the pressure side wall, the suction side wall and the tip cap. The core defines a number of conduits extending through the blade from the base to the trailing edge. The conduits channel cooling air and include at least three conduits. One conduit defines a leading channel that is substantially straight and that extends in a radial direction from the base to an end at the tip, where the leading channel is configured to eject a first part of the cooling air from the blade through the leading edge. Another conduit defines a primary tip flag channel that includes a radial segment extending in a radial direction from the base to the tip and includes a tip section that extends from the radial segment and runs along the tip to the trailing edge. The primary tip flag channel is spaced from the leading edge by the leading channel where the primary tip flag channel is configured to eject a second part of the cooling air from the blade through the trailing edge. A third conduit defines a secondary tip flag channel that includes a radial segment extending in the radial direction from the base to a radially inner side of the primary tip flag channel and includes a sub-tip segment extending from its radial segment to the trailing edge. The sub-tip segment is spaced away from the tip by the tip segment of the primary tip flag channel. The secondary tip flag channel is configured to eject a third part of the cooling air from the blade through the trailing edge. Film cooling holes are defined through the tip cap and into the primary tip flag channel. The primary tip flag channel and the secondary tip flag channel are configured to promote cooling of the tip by means of the locations of the tip segment and of the sub-tip segment in the blade(s).

In a number of other embodiments, a cooling system for a turbine, the cooling system includes a number of blades extending from a root. Each blade is defined between a base proximate the root and a tip distant from the root, and also from a leading edge to a trailing edge. The blade(s) includes an outer structure that has a pressure side wall and a suction side wall that join together at the leading edge and the trailing edge. The blade(s) includes a tip cap at the tip that joins with the pressure side wall and the suction side wall. A core is defined in the blade(s) within the pressure side wall, the suction side wall and the tip cap. The core defines a number of conduits extending through the blade from the base to the trailing edge. The conduits channel cooling air and include at least three conduits. One conduit defines a leading channel that is substantially straight and that extends in a radial direction from the base to an end at the tip, where the leading channel is configured to eject a first part of the cooling air from the blade through the leading edge and through a jet cavity. Another conduit defines a primary tip flag channel that includes a radial segment extending in a radial direction from the base to the tip and includes a tip section that extends from the radial segment and runs along the tip to the trailing edge. The primary tip flag channel is spaced from the leading edge by the leading channel where the primary tip flag channel is configured to eject a second part of the cooling air from the blade through tip and through the trailing edge. A third conduit defines a secondary tip flag channel that includes a radial segment extending in the radial direction from the base to a radially inner side of the primary tip flag channel and includes a sub-tip segment extending from its radial segment to the trailing edge. The sub-tip segment is spaced away from the tip by the tip segment of the primary tip flag channel. The secondary tip flag channel is configured to eject a third part of the cooling air from the blade through the trailing edge and through the pressure side wall. Film cooling holes are defined through the tip cap and into the primary tip flag channel. The primary tip flag channel and the secondary tip flag channel are configured to promote cooling of the tip by means of the locations of the tip segment and of the sub-tip segment in the blade(s).

In a number of additional embodiments, a cooling system for a turbine includes a number of blades. Each blade in the turbine extends from a root and is defined in one direction between a base proximate the root and a tip distant the root. The blade(s) is defined in a second direction from a leading edge to a trailing edge. The blade has an outer structure that includes a pressure side wall and a suction side wall joining together at the leading edge and the trailing edge, and the blade(s) includes a tip cap at the tip and joining with the pressure side wall and the suction side wall. A core is included in the blade(s) and is disposed within the pressure side wall, the suction side wall and the tip cap. The core defines a number of conduits extending through the blade that are configured to move cooling air from the base to the trailing edge. The number of conduits channel the cooling air and include channels. One conduit defines a leading channel that is substantially straight and that extends in a radial direction from the base to an end at the tip. The leading channel is configured to eject a first part of the cooling air from the blade through the leading edge through a jet cavity. Another conduit defines a primary tip flag channel that includes a first radial segment extending in a radial direction from the base to the tip and includes a tip section that extends from the first radial segment and runs along the tip to the trailing edge. The primary tip flag channel is spaced from the leading edge by the leading channel and the jet cavity. The primary tip flag channel is configured to eject a second part of the cooling air from the blade through the tip cap and through the trailing edge. Another conduit defines a secondary tip flag channel that includes a second radial segment extending in the radial direction from the base to a radially inner side of the primary tip flag channel and includes a sub-tip segment extending from the second radial segment to the trailing edge. The sub-tip segment is spaced away from the tip by the tip segment of the primary tip flag channel. The secondary tip flag channel is configured to eject a third part of the cooling air from the blade through the trailing edge and through the pressure side wall. Another conduit defines a trailing channel that includes a third radial segment extending from the base to a radially inner side of the secondary tip flag channel. A pin bank cavity is defined between the third radial segment and the trailing edge. A number of crossover holes are distributed spanwise along the trailing channel and connect the trailing channel to the pin bank cavity. The trailing channel is configured to eject a fourth part of the cooling air through the pin bank cavity and the trailing edge. Film cooling holes are defined through the tip cap and into the primary tip flag channel. The primary tip flag channel and the secondary tip flag channel are configured to promote cooling of the tip by means of their locations in a tip area of the blade(s). The pin bank cavity is isolated, in regard to cooling air flow, from both the tip flag channel and the secondary tip flag channel.

BRIEF DESCRIPTION OF DRAWINGS

The present disclosure will hereinafter be described in conjunction with the following drawing figures, wherein like numerals denote like elements, and wherein.

DETAILED DESCRIPTION

Figure 1:
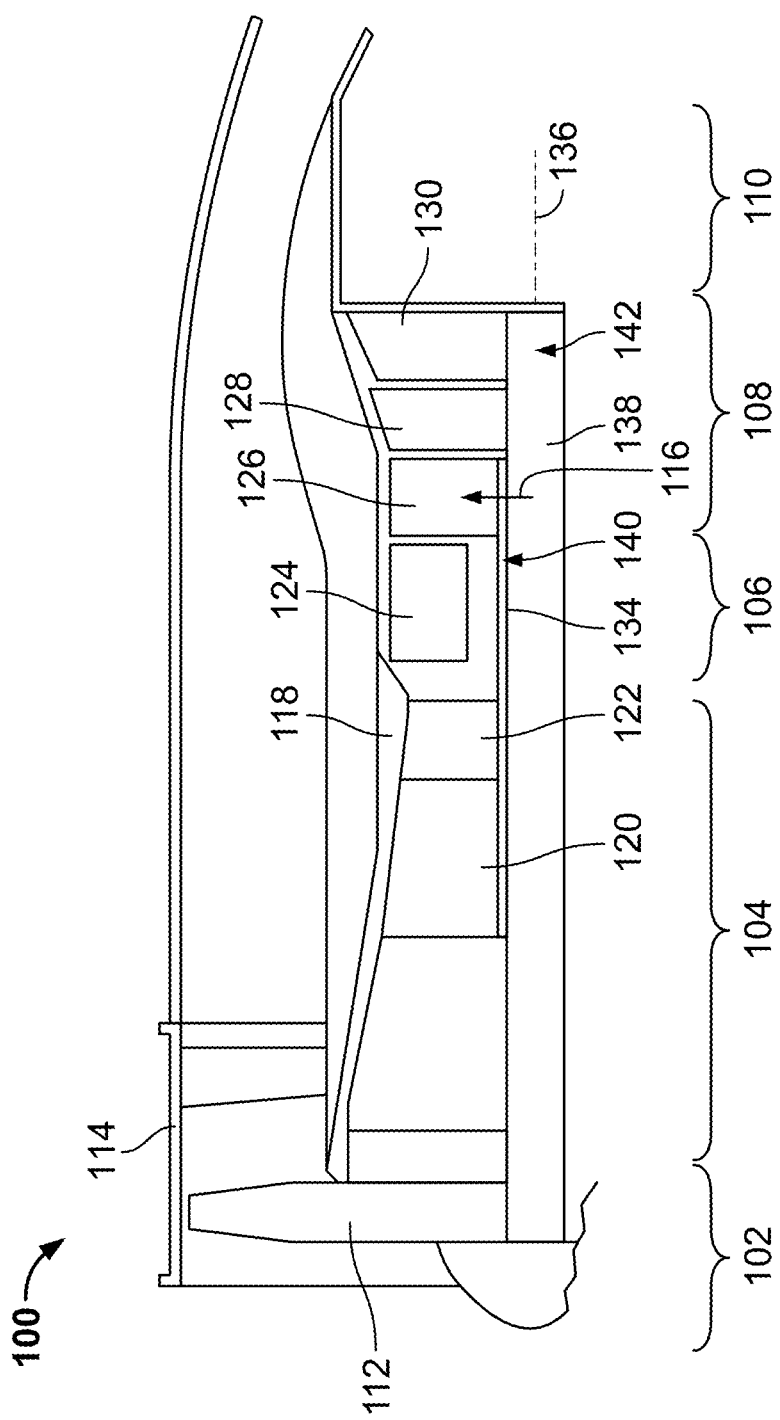
FIG. 1 is a schematic, fragmentary, sectional illustration of a representative half of a gas turbine engine, according to an exemplary embodiment.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "substantially" denotes within 5% to account for manufacturing tolerances. Also, as used herein, the term "about" denotes within 5% to account for manufacturing tolerances.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

The exemplary embodiments disclosed herein provide systems with enhanced levels of control in cooling turbine blades. Focus may be directed to edge cooling such as at blade tip areas and trailing edges. The ability to enact hot spot mitigation at places such as across the pressure side is provided. Cooler air at higher pressure is delivered to target cooling areas around the blades. As a result, impingement cooling, film cooling and internal pin/surface cooling (convection cooling) are all enhanced.

Referring to FIG. 1, a cross-sectional view of half (the upper half as viewed), of an exemplary engine 100 of the turbofan gas turbine engine is schematically illustrated. For purposes of this disclosure, the lower half can be considered similar. In general, the engine 100 includes a fan section 102, a compressor section 104, a combustion section 106, a turbine section 108, and an exhaust section 110. The fan section 102 includes a fan 112 mounted on a shaft 138 and contained within a fan casing 114. The fan 112 induces air from the surrounding environment into the engine 100 and passes a fraction of this air toward the compressor section 104.

The compressor section 104 includes at least one compressor and, in the depicted embodiment, includes an axial compressor 120 with a plural number of vane rows/stages and a centrifugal compressor 122 with an impeller. In other embodiments, a different compressor type may be used. The axial compressor 120 raises the pressure of the air directed into it from the fan 112 and directs the compressed air into the centrifugal compressor 122. The centrifugal compressor 122 discharges flow that is directed to the combustion section 106. The compressors 120, 122 are contained within a compressor casing or shroud 118. Some of the compressed air may be diverted (bled) from being directed into the combustion section 106. Some of the diverted air may be used for cooling and referred to as cooling air 116, some of which may be ducted to the area radially inside of the turbines in the turbine section 108.

The combustion section 106 of the engine 100 includes a combustor 124 in which high-pressure air from the compressors 120, 122 is mixed with fuel and combusted to generate a combustion gas. The combustion gas is then directed into the turbine section 108. The turbine section 108 includes a number of turbines disposed in an axial flow series. The combustion gas from the combustion section 106 expands first through a high-pressure turbine 126, passes through the inter-turbine duct 128, and expands again through a low-pressure turbine 130, causing the turbine rotors to rotate. The combustion mixture is then exhausted through the exhaust section 110. As the turbines 126 and 130 rotate, each respectively drives equipment in the engine 100 via concentrically disposed shafts 134 and 138 that rotate about an axis 136.

The shaft 134 may be referred to as a high pressure spool tie-shaft. The engine 100 in this example is a multi-spool engine. A high pressure spool 140 includes the high-pressure turbine 126, the axial compressor 120, the centrifugal compressor 122 and the shaft 134, which ties the components together in an assembly. As such, the high pressure turbine 126 drives the axial compressor 120 and the centrifugal compressor 122.

A low pressure spool 142 includes the low pressure turbine 130, the fan 112 and the shaft 138. The shaft 134 is a hollow shaft (at least in-part a hollow cylinder or cylindrical shaft), and the shaft 138 extends through the shaft 134. In other embodiments, other components may be coupled in the low pressure spool 142. In additional embodiments, a different arrangement may be employed. For example, the compressor section 104 may include a low pressure compressor and a high pressure compressor. In such an embodiment, the high pressure spool 140 may include the high pressure compressor and the low pressure spool may include the low pressure compressor. In still other embodiments, the shaft 134 may be assembled with other rotating components, such as in a pump or other rotating machinery type pieces of equipment.

Figure 2:
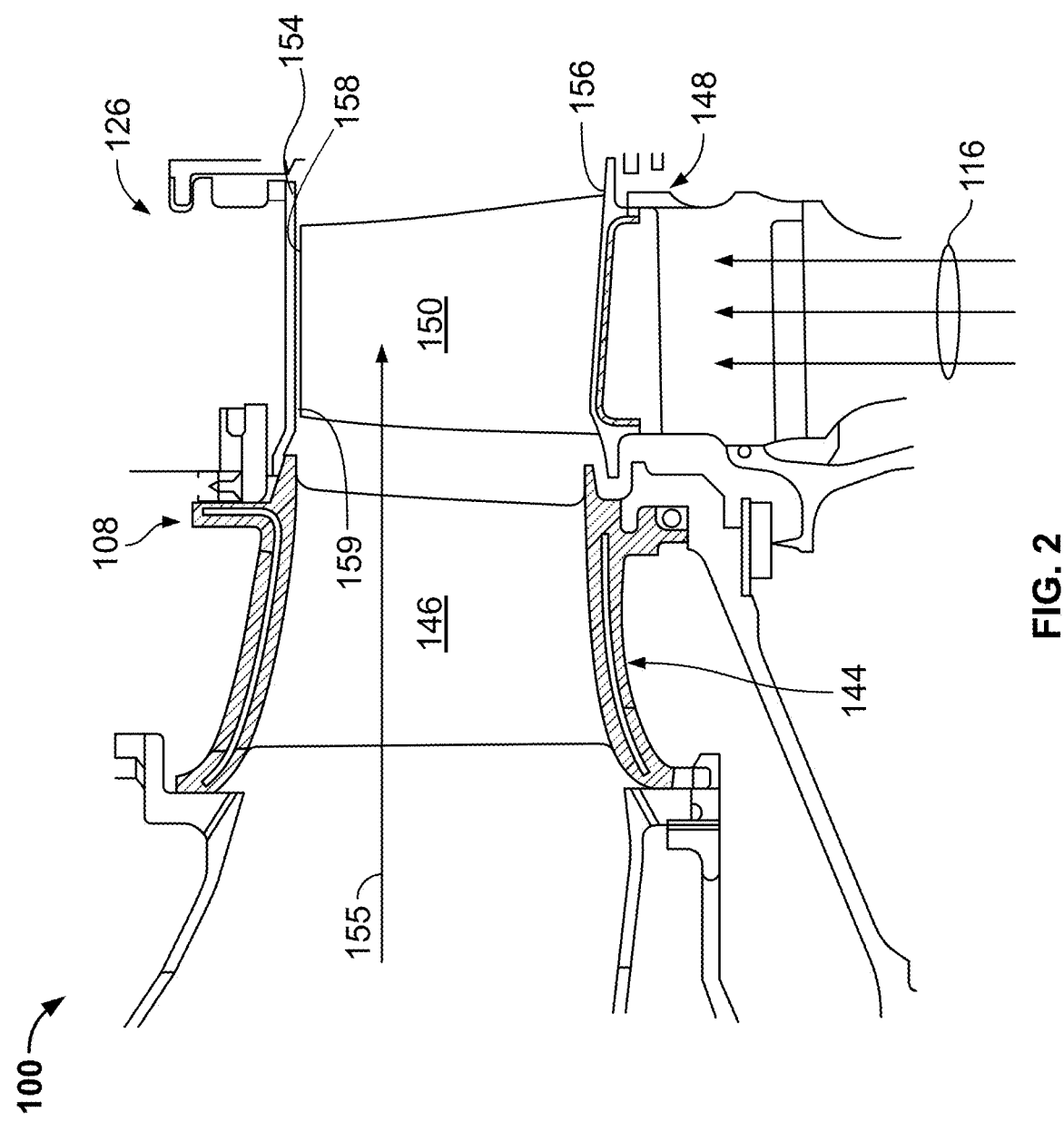
FIG. 2 is a schematic, sectional view of a part of the gas turbine engine of FIG. 1, in accordance with an exemplary embodiment.

Referring additionally to FIG. 2, the area of the engine 100 around the high pressure turbine 126 is shown in greater detail. FIG. 2 shows one stage of the turbine section 108. The high pressure turbine 126 includes a stator 144 with a number of stationary vanes (e.g. vane 146) and includes a rotor 148 that includes a number of rotating blades (e.g. blade 150). The example blade 150 in its rotor 148 is connected with the shaft 134 (FIG. 1) in the high pressure spool 140, along with other blades.

The rotor 148 is surrounded by a shroud 154 defining a gas flow path 155 through which hot, combusted air from the upstream compressor section (e.g. compressor section 104 of FIG. 1) is directed. Although only one turbine stator 144 and one turbine rotor 148 are shown, such stators 144 and rotors 148 may, in some embodiments, be arranged in multiple alternating axially spaced, circumferential rows.

The turbine stator 144 directs the gas toward the turbine rotor 148. The gas impinges upon rotor blades 150 of the turbine rotor 148, thereby driving it for power extraction. To allow the turbine section 108 to operate at desirable elevated temperatures, certain components are cooled. For example, the rotor blade 150 may be cooled by the cooling air 116 as described in greater detail below.

The rotor blade 150 includes a base 156 at its radially inner end and a tip 158 at its radially outer end. Some gas may move through the gap 159 over the tip 158, but in doing so may result in inefficiencies/losses and so is therefore minimized. To limit such losses, cooling air from inside the blade 150 may be expelled at the tip 158, as described in more detail below. High temperature gas impinging on and passing over the turbine rotor 148 may cause the blade 150 to undergo significant transient conditions and high thermal loads, including at the area of the tip 158. High heat exposure presents challenges to achieving acceptable blade life. Higher temperatures combined with higher levels of tip leakage flow result in higher heat load which may lead to higher tip metal temperatures and reduction in blade life due to thermal stress.

Figure 3:
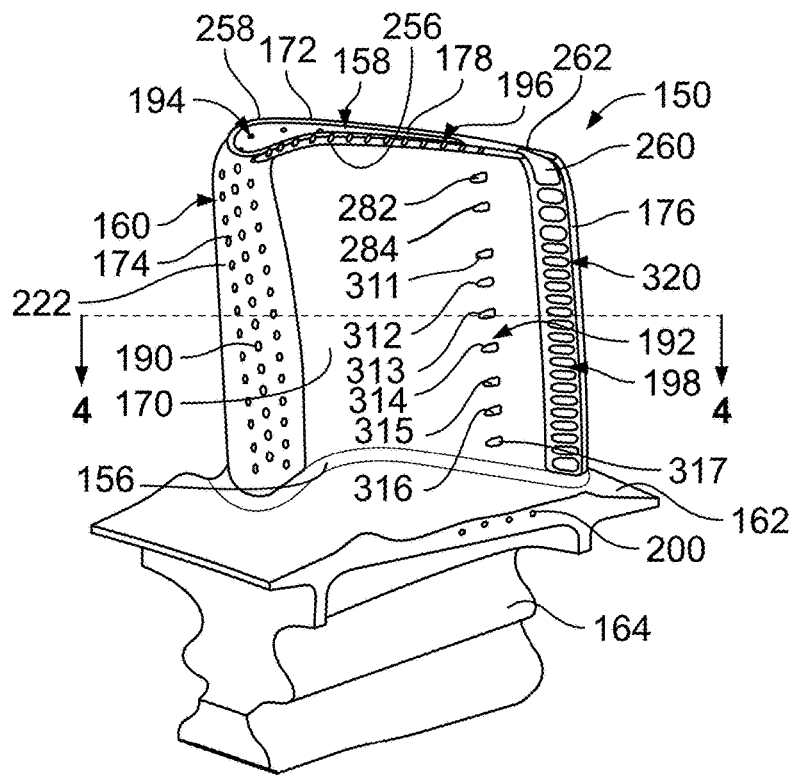
FIG. 3 is a perspective view of a turbine blade of FIGS. 1 and 2, in accordance with an exemplary embodiment.

Referring additionally to FIG. 3, the rotor blade 150 is shown removed from its rotor 148. The blade 150 includes an airfoil 160, a platform 162 and a root 164. The platform 162 is configured to fit into the engine 100 and seal the hot gas flow path 155 from the radially inner part of the engine 100. The root 164 may be described as dovetail in shape and provides a type of key to attach the blade 150 to the turbine rotor 148. It will be appreciated that other suitable shapes of the root 164 may be used for attaching the blade 150 in the rotor 148.

The airfoil 160 has a concave outer wall referred to as pressure side wall 170, a convex outer wall referred to as suction side wall 172, a leading edge 174, a trailing edge 176, and a tip cap 178, each having outer surfaces of walls that together define the airfoil shape. To cool the pressure side wall 170, the suction side wall 172, and the tip cap 178, an interior portion of the blade 150 includes a cooling system 180 with various outlets around the airfoil shape, aspects of which are shown in FIGS. 4-7. The cooling system 180 is configured to direct the cooling air 116 delivered through the root 164 to one or more patterns of leading edge film cooling holes 190 around the leading edge 174, pressure side wall film cooling holes 192, tip cap film cooling holes 194, tip pressure side edge film cooling holes 196 and/or trailing edge slots 198 (three sets). Convective and/or film cooling passages 200 may be provided through the platform 162.

Figure 4:
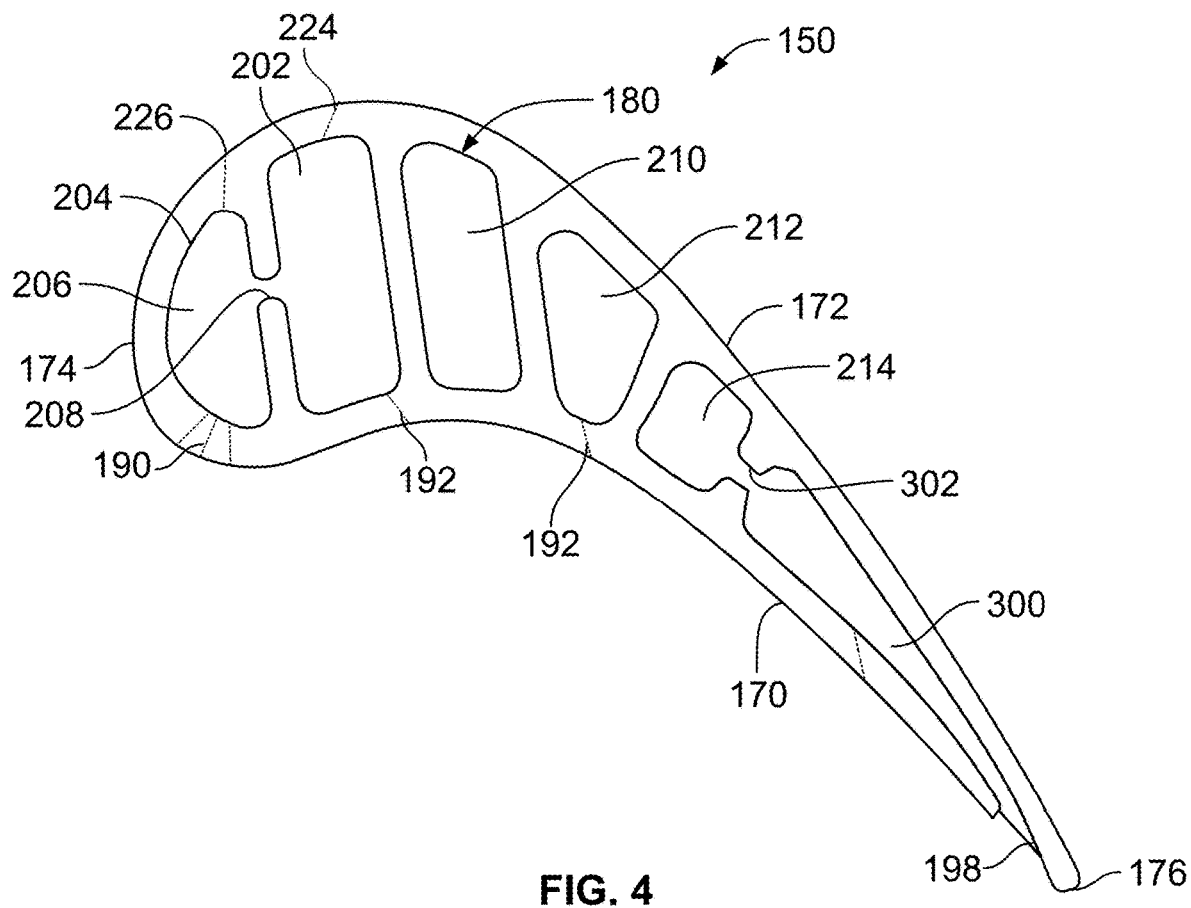
FIG. 4 is a schematic, sectional view taken generally through the line 4-4 of FIG. 3, in accordance with an exemplary embodiment.

As shown in FIG. 4, a mid-span cross section of the blade 150 shows internal aspects of the cooling system 180. The cooling system 180 includes a leading channel 202 for delivering cooling air to a showerhead 204 that defines a jet cavity 206 through jet holes 208. The cooling system 180 also includes a primary tip flag channel 210, a secondary tip flag channel 212, a trailing channel 214 and a pin bank cavity 300. The pin bank cavity 300 is fed cooling air from the trailing channel 214 through crossover holes 302 distributed spanwise along the trailing channel 214. The cooling system 180 may be described as a type of parallel cooling circuit where the leading channel 202, the primary tip flag channel 210, the secondary tip flag channel 212 and the trailing channel 214 all deliver cooling air separately from each other, where each may be tailored to its cooling requirements/priorities.

Figure 5:
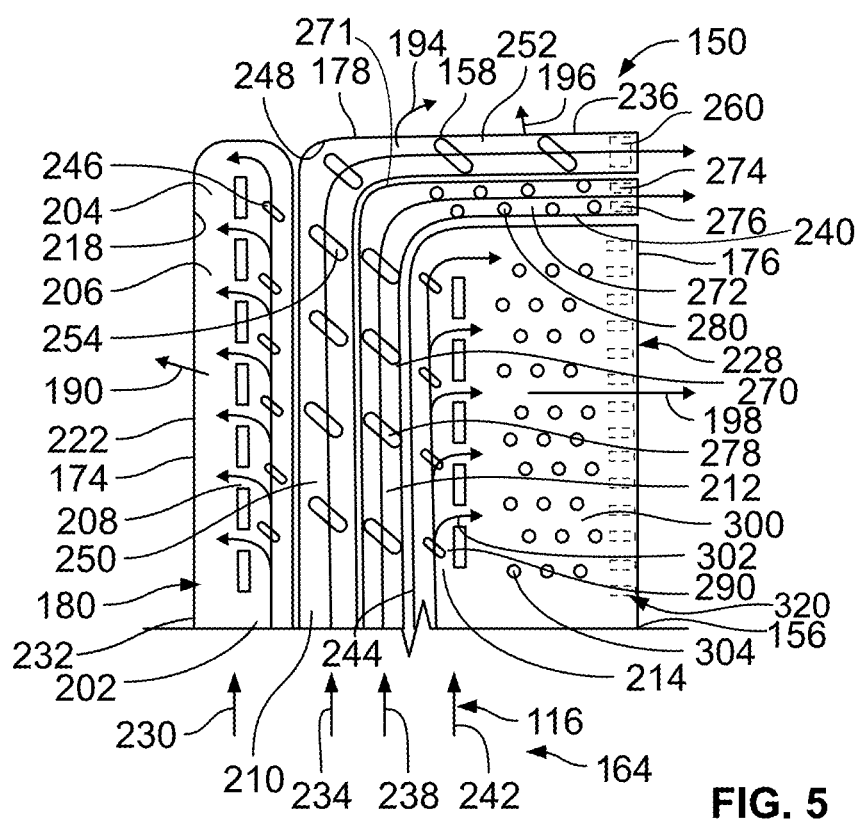
FIG. 5 is a schematic, sectional illustration of the internal structure of the core of the blade of FIG. 3, in accordance with an exemplary embodiment.

Reference is directed to FIG. 5 along with FIGS. 3 and 4, where FIG. 5 illustrates the internal structure of the blade 150 in its core 228. It can be seen that the cooling system 180 has four separate cooling air feeds coming through the root 164 and the platform 162 (FIG. 3). These feeds include a cooling air flow 230 through a feed conduit 232 that supplies the leading channel 202, a cooling air flow 234 through a feed conduit 236 that supplies the primary tip flag channel 210, a cooling air flow 238 through a feed conduit 240 that supplies the secondary tip flag channel 212, and a cooling air flow 242 through a feed conduit 244 that supplies the trailing channel 214. The showerhead 204 and the jet cavity 206 are supplied with cooling air by the cooling air flow 230 through the feed conduit 232 and through the leading channel 202. The pin bank cavity 300 is supplied with cooling air by the cooling air flow 242 through the feed conduit 244 and the trailing channel 214. Each of the channels including the leading channel 202, the primary tip flag channel 210, the secondary tip flag channel 212 and the trailing channel 214 are defined by walls of conduits that may be extensions that are integral to, or connected with, their respective feed conduits 232, 236, 240 and 244.

The leading channel 202 extends spanwise from the base 156 of the blade 150 to an end point adjacent to, or at, the inside surface of the tip cap 178. The leading channel 202 is a substantially straight channel that extends radially through the blade 150 to advantageously minimize the pressure drop through its structure. A very low pressure drop means that cooling air is efficiently delivered for leading edge cooling. Providing a separate supply of cooling air through the feed conduit 232 enables separate and independent tuning of the cooling air supply to the leading edge 174. As shown in FIG. 5, the internal wall of the leading channel 202 includes a number of turbulators 246 to enhance convective heat transfer in the leading channel 202. The turbulators 246 may take any number of shapes projecting from the wall into the leading channel 202 as bumps to interact with the air flow.

The leading channel 202 feeds the leading edge film cooling holes 190 through the showerhead 204. The showerhead 204 extends along the leading edge 174 in a spanwise direction and defines the jet cavity 206. Cooling air enters the jet cavity 206 from the leading channel 202 through the jet holes 208. The aperture size of the jet holes 208 is tailored to enhance impingement cooling of the leading edge 174 due to the air passing through the jet holes 208 and being directed onto the leading edge wall 218 of the showerhead 204. The jet impingement cooling is provided by the jet holes 208 being distributed across the spanwise direction of the blade 150 for uniform cooling of the leading edge 174. Cooling air from the jet cavity 206 exits through the leading edge 174 via the leading edge film cooling holes 190. The cooling air ejected through the leading edge film cooling holes 190 onto the surface 222 of the blade 150 creates a thin film between the blade surface 222 and the hot gases in the gas flow path 155.

Some of the cooling air from the leading channel 202 and/or from the showerhead 204 may be ejected through the leading edge end of the tip cap 178 for film cooling thereof. For film cooling of the suction side wall 172, some of the cooling air in the leading channel 202 may be ejected onto the suction side wall 172 through film cooling holes 224 (FIG. 4) and/or from the showerhead 204 through film cooling holes 226. For film cooling of the pressure side wall 170, some of the cooling air in the leading channel 202 may be ejected onto the pressure side wall 170 through film cooling holes 192 (FIG. 4) and/or from the showerhead 204 through film cooling holes (not shown). Supplying film cooling hole rows on the pressure and/or suction side by the leading channel 202 and/or the showerhead 204 avoids taking any flow away from the primary tip flag channel 210 for that purpose.

The primary tip flag channel 210 is the second channel from the leading edge 174 after the leading channel 202. The air flow in the primary tip flag channel 210 is not interconnected with the air flow in the leading channel 202 and is therefore a separate supply. The primary tip flag channel 210 includes a radial segment 250 that extends spanwise from the base 156 of the blade 150 to a point 248 adjacent or at the radially inner surface of the tip cap 178, where the primary tip flag channel 210 bends through approximately ninety degrees and continues through a tip segment 252 along the tip cap 178 to the trailing edge 176. The bend is the only turn (a single turn) in the primary tip flag channel 210 to provide as direct a feed from the base 156 to the trailing edge 176 as possible and also to cool the tip 158. The radial segment 250 is substantially straight delivering cooling air directly to the area of the tip 158. The tip segment 252 provides a dedicated (and the only) supply of cooling air to the tip 158 rearward of the leading channel 202. Cooling is provided along the area of the tip 158 within the primary tip flag channel 210. Turbulators 254 are provided in both the radial segment 250 and the tip segment 252 to enhance convective heat transfer in the primary tip flag channel 210.

The tip cap film cooling holes 194 are provided through the primary tip flag channel 210 and the tip cap 178 for cooling the tip 158. A row of the tip pressure side edge film cooling holes 196 is supplied by the primary tip flag channel 210. These pressure side edge film cooling holes 196 may be disposed along a pressure side tip edge 256 of a contoured tip implementation as shown in FIG. 3 and may also be employed with a non-contoured straight tipped blade embodiment.

The aerodynamically contoured blade tip 158 shown in FIG. 3 has a radiused edge 258 (FIG. 3) on the suction side and ejects high momentum air out the tip pressure side edge film cooling holes 196 for cooling and also for inhibiting rotor tip leakage and suppression of secondary kinetic energy losses associated with vorticity otherwise generated from tip leakage over the suction side of the tip 158. Pressure side tip edge 256 and tip cap 178 cooling are fed by the dedicated primary tip flag channel 210. This delivers optimal cooling and high-momentum air for effective contoured blade tip aerodynamics.

The primary tip flag channel 210 ejects air through the trailing edge 176 at a slot 260, providing high span trailing edge cooling. The ejection is at a point of relatively low static pressure to effect a desirable mass flow rate of cooling air through the primary tip flag channel 210. The geometric area of the exit leading to the slot 260 is sized to meter/throttle the flow through the primary tip flag channel 210 to create a desirable back pressure in the entire primary tip flag channel 210. As shown in FIG. 3, the tip segment 252 tapers down to a smaller flow cross sectional area at a throttle 262 and then flares larger to the slot 260. The increased internal pressure created by the throttle 262 provides increased flow for cooling of the area of the tip 158 through the tip cap film cooling holes 194 and the tip pressure side edge film cooling holes 196.

The secondary tip flag channel 212 is the third channel from the leading edge 174 after the leading channel 202 and the primary tip flag channel 210. The air flow in the secondary tip flag channel 212 is essentially not interconnected with the air flow in the primary tip flag channel 210 and is therefore a separate supply. The secondary tip flag channel 212 includes a radial segment 270 that extends spanwise from the base 156 of the blade 150 to a point 271 adjacent to, or at, the radial inside edge of the primary tip flag channel 210 and bends through approximately ninety degrees and continues through a sub-tip segment 272 along the primary tip flag channel 210 to the trailing edge 176. The radial segment 270 is substantially straight delivering cooling air directly to the area near the tip 158 as separated therefrom by the primary tip flag channel 210. Direct delivery minimizes the amount of heat picked up before reaching the tip area. The sub-tip segment 272 provides a dedicated supply of cooling air to the high span part of the trailing edge 176 through slots 274 and 276 where air is ejected at a relatively low static pressure point for promoted flow. In alternate embodiments, the number of slots 274 and 276 may be less than two slots, for example, one slot, or more than two slots, for example, three or four slots. The bend is the only turn in the secondary tip flag channel 212 to provide as direct a feed from the base to the trailing edge 176 as possible. The secondary tip flag channel 212 does not deliver film cooling to the tip 158. Cooling is provided along the area near the tip 158 within the secondary tip flag channel 212. This near-tip or sub-tip cooling assists the primary tip flag channel 210 in transferring heat away from the tip 158. The sub-tip moniker is used because of the location near the tip 158 and separated from the tip 158 only by the tip segment 252 (i.e. tip adjacent) to help remove heat from the area of the tip 158. As shown in FIG. 5, turbulators 278 are provided in the radial segment 270 and pins 280 are provided in the sub-tip segment 272 to enhance convective heat transfer in the secondary tip flag channel 212. The pins 280 in the sub-tip segment 272 assist in cooling the tip area. A pressure side film cooling hole 282 may be employed in the primary tip flag channel 210. A pressure side film cooling hole 284 may be employed in the secondary tip flag channel 212. The pressure side wall film cooling holes 282 and 284 are located to provide spill over at the trailing edge 176 area of the tip 158 for desirable hot spot trailing edge tip cooling. In some embodiments, film cooling holes 282 and 284 may be omitted. In other embodiments, the primary tip flag channel 210 may employ multiple film holes 282. In still other embodiments, the secondary tip flag channel 212 may employ multiple film holes 284.

The trailing channel 214 is the fourth channel from the leading edge 174 after the leading channel 202, the primary tip flag channel 210 and the secondary tip flag channel 212. The air flow in the trailing channel 214 is not interconnected with the air flow in the secondary tip flag channel 212 and is therefore a substantially separate supply. The trailing channel 214 includes a radial segment 290 that extends spanwise from the base 156 of the blade 150 to a point adjacent to, or at, the radial inside of the sub-tip segment 272 of the secondary tip flag channel 212. The radial segment 290 is substantially straight and directly provides cooling air supply without significant pressure loss to the pin bank cavity 300 through crossover holes 302. The pins 304 are distributed throughout the pin bank cavity 300 for uniform cooling. Pressure side film cooling is provided through pressure side wall film cooling holes 311-317 of the row of pressure side wall film cooling holes 192. The trailing channel 214 ejects air through the trailing edge 176 at a slot set 320. Cooling air in the pin bank cavity 300 is isolated from that in the primary tip flag channel 210 and the secondary tip flag channel 212.

The leading channel 202, the primary tip flag channel 210, the secondary tip flag channel 212 and the trailing channel 214 all deliver cooling air separately from each other. Separation means that the flow through each is not influenced, in any substantial way, by the flow through the others. This also means that each is tunable to provide the optimal pressure and temperature of the cooling air 116 independently and without significant changes needed to the casting of the blade 150 and the core 228.

Figure 6:
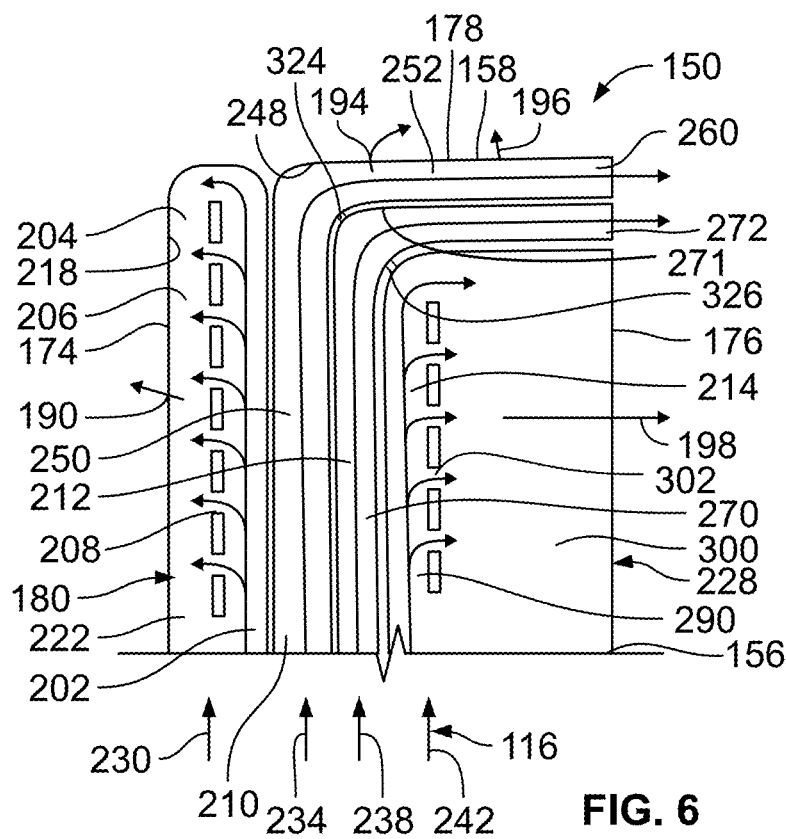
FIG. 6 is a schematic, sectional illustration of the internal structure of the core of the blade of FIG. 3 showing manufacturability features, in accordance with an exemplary embodiment.

Referring to FIG. 6, the core 228 may include features for manufacturability. For example, a pin passage 324, or a plural number of such openings may be provided. The pin passage 324 extends between the primary tip flag channel 210 and the secondary tip flag channel 212 through the walls thereof. A similar pin passage 326 may extend between the secondary tip flag channel 212 and the trailing channel 214. The pin passages 324 and 326 may be included to help stabilize the walls of the primary tip flag channel 210, the secondary tip flag channel 212 and the trailing channel 214 when the core 228 is being fabricated, such as during the ceramic phase of its investment casting. The pin passages 324 and 326 assist in robustly positioning the core 228 during the casting process for enhanced manufacturability and to expunge particulates from the cooling circuits for enhanced durability. These pin passages may remain in the blade 150 and define openings between the channels but at most, minimal air flow may pass through them. The channels are essentially not interconnected, with the air flow in the primary tip flag channel 210, the secondary tip flag channel 212 and the trailing channel 214 effectively being separate supplies of cooling air with substantially no crossover.

Figure 7:
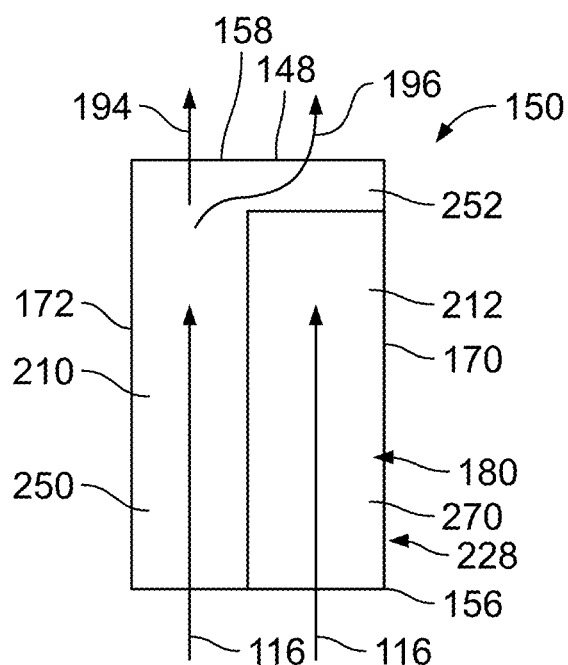
FIG. 7 is a schematic illustration of the turbine blade of FIG. 3 with pressure and suction side oriented passages, in accordance with an exemplary embodiment.

Referring to FIG. 7, an alternative packaging arrangement of the primary tip flag channel 210 and the secondary tip flag channel 212 is shown. Rather than the radial segments 250 and 270 being alongside each other in the direction from the leading edge 174 to the training edge 176, the radial segments 250 and 270 are alongside each other in a direction between the pressure side 170 and the suction side 172. The primary tip flag channel 210 is dedicated to supplying the tip cap film cooling holes 194 and the tip pressure side edge film cooling holes 196. The secondary tip flag channel 212 does not extend all the way to the tip 158 but is separated therefrom by the tip segment 252 of the primary tip flag channel 210. Either the primary tip flag channel 210 or the secondary tip flag channel 212 may be on the pressure side or on the suction side. This packaging arrangement may be advantageous for a multi-walled configuration.

In a number of embodiments, structural or other methods may be employed to control the distribution of cooling air flow into and through the various channels of the core 228. For example, the channels defined by the feed conduits 232, 236, 240 and 244 may be sized to tune the flow splits between channels by increasing or decreasing the amount of cooling air flow into and through each of them. In other embodiments, a metering plate may be included in or near the root 164 with orifices sized to provide the flow tuning. In other embodiments, the feed conduits 232, 236, 240 and 244 may have metering inserts with orifices sized to provide the flow tuning. In other embodiments, some other tunable flow control structure or device may be employed to provide the capability to fine tune the flow splits per cooling circuit. All options for flow tuning are contemplated within the scope of the current disclosure.

Accordingly, a turbine blade cooling system delivers separate, dedicated air supply to tip pressure side edge film cooling holes, which is beneficial to contoured and non-contoured tip implementations, and to cooling of the high-span pressure side wall and trailing edge. Beneficially, the primary pin bank, the high span trailing edge, film cooling, and tip cooling are supplied by separately fed channels that can be independently controlled, providing greater design flexibility and robustness.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A cooling system for a turbine, the cooling system comprising:
   at least one blade extending from a root, the blade defined in a first direction between a base proximate the root and a tip distant the root, and the blade defined in a second direction from a leading edge to a trailing edge, wherein the blade has an outer structure that includes a pressure side wall and a suction side wall joining together at the leading edge and the trailing edge, and the blade including a tip cap at the tip and joining with the pressure side wall and the suction side wall;
   a core in the blade within the pressure side wall, suction side wall and the tip cap, the core defining a number of conduits extending through the blade from the base to the trailing edge, the number of conduits channeling cooling air, and the number of conduits including:
   a first conduit defining a leading channel that is substantially straight and that extends in a radial direction from the base to an end at the tip, wherein the leading channel is configured to eject a first part of the cooling air from the blade through the leading edge;
   a second conduit defining a primary tip flag channel that is fluidly separated from the leading channel by a first common wall and that includes a first radial segment extending in a radial direction from the base to the tip and includes a tip section that extends from the first radial segment and runs along the tip to the trailing edge, the primary tip flag channel providing a direct route to the tip through the first radial segment and including no more than one bend in the primary tip flag channel between the base and the trailing edge, the primary tip flag channel spaced from the leading edge by the leading channel wherein the primary tip flag channel is configured to eject a second part of the cooling air from the blade through the trailing edge; and
   a third conduit defining a secondary tip flag channel that is fluidly separated from the primary tip flag channel by a second common wall and that includes a second radial segment extending in the radial direction from the base to a radially inner side of the primary tip flag channel and includes a sub-tip segment extending from the second radial segment to the trailing edge, the secondary tip flag channel providing a direct route to a sub-tip area located radially inside the tip section through the second radial segment, and includes no more than one bend in the secondary tip flag channel between the base and the trailing edge, the sub-tip segment spaced away from the tip by the tip segment of the primary tip flag channel wherein the secondary tip flag channel is configured to eject a third part of the cooling air from the blade through the trailing edge;
   wherein film cooling holes are defined through the tip cap and into the primary tip flag channel,
   wherein the primary tip flag channel and the secondary tip flag channel are configured to promote cooling of the tip through locations of the tip segment and of the sub-tip segment.

2. The cooling system of claim 1, wherein the primary tip flag channel includes a throttle in the tip segment adjacent the trailing edge, wherein the throttle tapers the tip segment down and then flares larger to a slot exit at the trailing edge, and wherein the throttle is configured to increase internal pressure for cooling flow at the tip through tip cap film cooling holes and tip pressure side edge film cooling holes.

3. The cooling system of claim 1, wherein a tip edge is defined at a juncture between the tip cap and the pressure side wall, wherein a plurality of tip pressure side edge film cooling holes extend through the tip edge and into the primary tip flag channel, wherein the tip pressure side edge film cooling holes are supplied with cooling air solely by the primary tip flag channel.

4. The cooling system of claim 3, wherein a second tip edge is defined at a suction side of the tip cap, the second tip edge having an aerodynamically contoured radius.

5. The cooling system of claim 1, wherein pressure side film cooling holes are defined through the pressure side wall and into the primary tip flag channel and/or the secondary tip flag channel.

6. The cooling system of claim 1, comprising a showerhead defining a jet cavity and located between the leading cavity and the leading edge, the leading cavity ejecting the first part of the cooling air through the jet cavity, wherein the primary tip flag channel is not connected with the leading cavity so that the primary tip flag channel does not deliver any part of the cooling air through the leading edge which is supplied solely by the leading cavity.

7. The cooling system of claim 1, wherein the primary tip flag channel is defined, in entirety, by the first radial segment, the no more than one bend in the primary tip flag channel, and the tip segment, so that the second part of the cooling air passes from the base to the trailing edge through the first radial segment, the no more than one bend in the primary tip flag channel, and the tip segment, to provide a direct feed of the second part of the cooling air to the trailing edge with no more than a single turn, wherein the secondary tip flag channel is defined, in entirety, by the second radial segment, the no more than one bend in the secondary tip flag channel, and the sub-tip segment, so that the third part of the cooling air passes from the base to the trailing edge through the first radial segment, the no more than one bend in the secondary tip flag channel, and the sub-tip segment to provide a direct feed of the second part of the cooling air to the trailing edge with no more than a single turn.

8. The cooling system of claim 1, wherein the primary tip flag channel and the secondary tip flag channel are configured, through the first radial segment and the tip segment, and the second radial segment and the sub-tip segment, to deliver focused cooling to the tip and high-span trailing edge of the blade.

9. The cooling system of claim 1, wherein the number of conduits include a fourth conduit defining a trailing channel that includes a third radial segment extending from the base to a radially inner side of the secondary tip flag channel, wherein a pin bank cavity is defined between the third radial segment and the trailing edge, wherein the leading channel, the primary tip flag channel, the secondary tip flag channel and the trailing channel are all fluidly separate from one another and are independently tunable for flow without influencing each other.

10. The cooling system of claim 1, wherein the number of conduits include a fourth conduit defining a trailing channel that includes a third radial segment extending from the base to a radially inner side of the secondary tip flag channel, wherein a pin bank cavity is defined between the third radial segment and the trailing edge, wherein a number of crossover holes are distributed spanwise along the trailing channel and connect the trailing channel to the pin bank cavity, wherein the trailing channel is configured to eject a fourth part of the cooling air through the pin bank cavity and the trailing edge, wherein the fourth part of the cooing air is isolated from the second part of the cooling air in the primary tip flag channel and from the third part of the cooling air in the secondary tip flag channel.

11. A cooling system for a turbine, the cooling system comprising:
  at least one blade in the turbine that extends from a root, the blade defined in a first direction between a base proximate the root and a tip distant the root, and the blade defined in a second direction from a leading edge to a trailing edge, wherein the blade has an outer structure that includes a pressure side wall and a suction side wall joining together at the leading edge and the trailing edge, and the blade including a tip cap at the tip and joining with the pressure side wall and the suction side wall;
  a core in the blade and disposed within the pressure side wall, the suction side wall and the tip cap, the core defining a number of conduits extending through the blade and configured to move cooling air from the base to the trailing edge, the number of conduits channeling the cooling air, and the number of conduits including:
  a first conduit defining a leading channel that is substantially straight and that extends in a radial direction from the base to an end at the tip, wherein the leading channel is configured to eject a first part of the cooling air from the blade through the leading edge through a jet cavity;
  a second conduit defining a primary tip flag channel that is fluidly separated from the leading channel by a first common wall and that includes a first radial segment extending in a radial direction from the base to the tip and includes a tip section that extends from the first radial segment and runs along the tip to the trailing edge, the primary tip flag channel providing a direct route to the tip through the first radial segment and including no more than one bend in the primary tip flag channel between the base and the trailing edge, the primary tip flag channel spaced from the leading edge by the leading channel and the jet cavity, wherein the primary tip flag channel is configured to eject a second part of the cooling air from the blade through the tip cap and through the trailing edge; and
  a third conduit defining a secondary tip flag channel that is fluidly separated from the primary tip flag channel by a second common wall and that includes a second radial segment extending in the radial direction from the base to a radially inner side of the primary tip flag channel and includes a sub-tip segment extending from the second radial segment to the trailing edge, the secondary tip flag channel providing a direct route to a sub-tip area located radially inside the tip section through the second radial segment, and includes no more than one bend in the secondary tip flag channel between the base and the trailing edge, the sub-tip segment spaced away from the tip by the tip segment of the primary tip flag channel, wherein the secondary tip flag channel is configured to eject a third part of the cooling air from the blade through the trailing edge and through the pressure side wall;
  wherein film cooling holes are defined through the tip cap and into the primary tip flag channel,
  wherein the primary tip flag channel and the secondary tip flag channel are configured to promote cooling of the tip by locations of the tip segment and of the sub-tip segment in a tip area of the blade.

12. The cooling system of claim 11, wherein the primary tip flag channel includes a throttle in the tip segment adjacent to the trailing edge and configured to increase pressure in the primary tip flag channel, wherein the throttle tapers the tip segment down and then flares larger to a slot exit at the trailing edge, and wherein the throttle is configured to increase internal pressure for cooling flow at the tip through tip cap film cooling holes and tip pressure side edge film cooling holes.

13. The cooling system of claim 11, wherein a tip edge is defined at a juncture between the tip cap and the pressure side wall, wherein a row of tip pressure side edge film cooling holes extend through the tip edge and into the primary tip flag channel, wherein the tip pressure side edge film cooling holes are supplied with cooling air solely by the primary tip flag channel.

14. The cooling system of claim 13, wherein a second tip edge is defined at a suction side of the tip cap, the second tip edge having an aerodynamically contoured radius.

15. The cooling system of claim 11, wherein pressure side film cooling holes are defined through the pressure side wall and into the primary tip flag channel and/or the secondary tip flag channel.

16. The cooling system of claim 11, comprising a showerhead defining the jet cavity and located between the leading cavity and the leading edge, the leading cavity ejecting the first part of the cooling air through the jet cavity, wherein the primary tip flag channel is not connected with the leading cavity so that the primary tip flag channel does not deliver any part of the cooling air through the leading edge which is supplied solely by the leading cavity.

17. The cooling system of claim 11, wherein the primary tip flag channel is defined, in entirety, by the first radial segment, the no more than one bend in the primary tip flag channel, and the tip segment, so that the second part of the cooling air passes from the base to the trailing edge through the first radial segment, the no more than one bend in the primary tip flag channel, and the tip segment, to provide a direct feed of the second part of the cooling air to the trailing edge with no more than a single turn in the primary tip flag channel, wherein the secondary tip flag channel is defined, in entirety, by the second radial segment, the no more than one bend in the secondary tip flag channel, and the sub-tip segment, so that the third part of the cooling air passes from the base to the trailing edge through the first radial segment, the no more than one bend in the secondary tip flag channel, and the sub-tip segment to provide a direct feed of the second part of the cooling air to the trailing edge with no more than a single turn.

18. The cooling system of claim 11, wherein the primary tip flag channel and the secondary tip flag channel are configured, through the first radial segment and the tip segment, and the second radial segment and the sub-tip segment, to deliver focused cooling to the tip and high-span trailing edge of the blade.

19. The cooling system of claim 11, wherein the number of conduits include a fourth conduit defining a trailing channel that includes a third radial segment extending from the base to a radially inner side of the secondary tip flag channel, wherein a pin bank cavity is defined between the third radial segment and the trailing edge, wherein the leading channel, the primary tip flag channel, the secondary tip flag channel and the trailing channel are all fluidly separate from one another and are independently tunable for flow without influencing each other.

20. A cooling system for a turbine, the cooling system comprising:

at least one blade in the turbine that extends from a root, the blade defined in a first direction between a base proximate the root and a tip distant the root, and the blade defined in a second direction from a leading edge to a trailing edge, wherein the blade has an outer structure that includes a pressure side wall and a suction side wall joining together at the leading edge and the trailing edge, and the blade including a tip cap at the tip and joining with the pressure side wall and the suction side wall;

a core in the blade and disposed within the pressure side wall, the suction side wall and the tip cap, the core defining a number of conduits extending through the blade and configured to move cooling air from the base to the trailing edge, the number of conduits channeling the cooling air, and the number of conduits including:

a first conduit defining a leading channel that is substantially straight and that extends in a radial direction from the base to an end at the tip, wherein the leading channel is configured to eject a first part of the cooling air from the blade through the leading edge through a jet cavity;

a second conduit defining a primary tip flag channel that is fluidly separated from the leading channel by a first common wall and that includes a first radial segment extending in a radial direction from the base to the tip and includes a tip section that extends from the first radial segment and runs along the tip to the trailing edge, the primary tip flag channel providing a direct route to the tip through the first radial segment and including no more than one bend in the primary tip flag channel between the base and the trailing edge, the primary tip flag channel spaced from the leading edge by the leading channel and the jet cavity, wherein the primary tip flag channel is configured to eject a second part of the cooling air from the blade through the tip cap and through the trailing edge;

a third conduit defining a secondary tip flag channel that is fluidly separated from the primary tip flag channel by a second common wall and that includes a second radial segment extending in the radial direction from the base to a radially inner side of the primary tip flag channel and includes a sub-tip segment extending from the second radial segment to the trailing edge, the secondary tip flag channel providing a direct route to a sub-tip area located radially inside the tip section through the second radial segment, and includes no more than one bend in the secondary tip flag channel between the base and the trailing edge, the sub-tip segment spaced away from the tip by the tip segment of the primary tip flag channel, wherein the secondary tip flag channel is configured to eject a third part of the cooling air from the blade through the trailing edge and through the pressure side wall; and a fourth conduit defining a trailing channel that includes a third radial segment extending from the base to a radially inner side of the secondary tip flag channel, wherein a pin bank cavity is defined between the third radial segment and the trailing edge, wherein a number of crossover holes are distributed spanwise along the trailing channel and connect the trailing channel to the pin bank cavity, wherein the trailing channel is configured to eject a fourth part of the cooling air through the pin bank cavity and the trailing edge, wherein film cooling holes are defined through the tip cap and into the primary tip flag channel, wherein the primary tip flag channel and the secondary tip flag channel are configured to promote cooling of the tip by locations of the tip segment and of the sub-tip segment in a tip area of the blade, wherein the leading channel, the primary tip flag channel, the secondary tip flag channel and the trailing channel are all fluidly separate from one another and are independently tunable for flow without influencing each other.

\* \* \* \* \*